United States Patent [19]

Iwasyk

[11] 4,090,261
[45] May 16, 1978

[54] APPARATUS FOR FINISHING HIGH VISCOSITY SYNTHETIC POLYMERS

[75] Inventor: John Maurice Iwasyk, Wilmington, Del.

[73] Assignee: E. I. Du Pont de Nemours and Company, Wilmington, Del.

[21] Appl. No.: 791,940

[22] Filed: Apr. 28, 1977

[51] Int. Cl.² .................................................. A21C 1/02
[52] U.S. Cl. .................................... 366/83; 366/297; 366/323
[58] Field of Search .................................... 259/5-8, 259/18-24, 104, 191, 192, DIG. 30; 425/204, 207

[56] References Cited

U.S. PATENT DOCUMENTS

| | | | |
|---|---|---|---|
| 3,365,177 | 1/1968 | Daman | 259/23 |
| 3,717,330 | 2/1973 | Pinney | 259/6 |
| 3,929,416 | 12/1975 | Tanaka et al. | 259/8 |
| 3,986,704 | 10/1976 | Risse | 259/6 |

Primary Examiner—Harvey C. Hornsby
Assistant Examiner—Timothy F. Simone

[57] ABSTRACT

An improved polymerization apparatus for finishing high viscosity synthetic polymers involves a vessel having vertical rotating elements which fully wipe the interior surface of the vessel including the top inner surface. Entrances located in the top of the vessel for feeding streams containing molten polymer downwardly into the vessel deposit fresh polymer on the walls and on the upper element surfaces which wipe the top inner surface. A reservoir formed by the leading edge of a raised portion on the upper end surface of the elements facilitates collecting and spreading a fresh supply of polymer on the top inner surface of the vessel to help eliminate stagnant polymer areas thereon during operation.

7 Claims, 3 Drawing Figures

APPARATUS FOR FINISHING HIGH VISCOSITY SYNTHETIC POLYMERS

BACKGROUND OF THE INVENTION

The invention concerns a polymerization apparatus for finishing high viscosity synthetic condensation polymers. More particularly, it concerns an apparatus having vertical rotating screw elements which fully wipe the interior surfaces of the finisher apparatus.

U.S. Pat. No. 3,717,330 issued to Pinney describes a separator-finisher apparatus suitable for use in the production of synthetic condensation polymers such as polyamides and polyesters. The apparatus disclosed in the patent includes a vessel having an interior surface throughout its vertical length in the shape of two intersecting conical frustums with parallel and substantially vertical axes, the bases of the frustums being displaced upwards with respect to the apexes, two interengaging helical screw elements rotatably mounted within the vessel which upon co-rotation conform to the interior surface of the vessel such that the screw elements effect a complete wiping of the interior surface of the vessel, and the screw elements interengage each other uninterruptedly along their lengths such that each element effects a complete wiping of an adjacent element. The entire disclosure of the Pinney patent is incorporated herein by way of reference.

When such an apparatus is used for the preparation of polymers, such as poly(hexamethylene adipamide), which are particularly susceptible to thermal degradation and gelation in stagnant regions of a processing vessel, it is particularly desirable to continuously supply fresh polymer to all the wiped surfaces. In so doing, care should be taken to avoid undue splashing which results in the generation of suspended molten polymer particles (aerosols) which can be carried out of a vent and create deposition problems in a venting system. Because of the vertical arrangement of any such apparatus, special care should be taken to supply fresh polymer to the top inner surface during use. This not only utilizes the maximum surface area for promoting reaction, but also prevents stagnation and polymer degradation on this surface.

The present invention provides an improvement in the apparatus of the type described in the Pinney patent. More particularly, it provides a modification of the upper ends of the screw elements which enhances their ability to carry fresh polymer material through a complete revolution and to spread polymer on the entire upper inner surface of the vessel. The modified screw elements are used in combination with vertical polymer inlet nozzles which deposit incoming polymer directly on the ends of the elements as they pass beneath the nozzles.

SUMMARY OF THE INVENTION

This invention provides in an apparatus for finishing high viscosity synthetic polymers including an enclosed vessel having an interior surface throughout its length in the shape of two intersecting conical frustums with axes parallel and substantially vertical, the base of the frustums being displaced upward with respect to the apexes, a vent in the upper portion of the vessel and a discharge in the lower portion of the vessel, two interengaging helical screw elements rotatably supported on shafts passing through seals in the base of the vessel, the screw elements when co-rotated conforming to the interior surface of the vessel such that the screw elements effect a complete wiping of the interior surface, and wherein the screw elements interengage uninterruptedly along their lengths such that each element effects a complete wiping of the adjacent element, the bottom portion of the screw elements forming a pressure generating zone and the top portion of the screw elements forming a mixing zone having a hollow center described by the co-rotating screw elements, the vessel having a top plate with a flat inner surface, each screw element having an upper end with a substantially flat upper surface, these flat upper surfaces upon co-rotation effecting complete wiping of the inner surface of the top plate, and at least one polymer inlet in the top plate for feeding molten polymer downwardly into the vessel, the improvement comprising:

said polymer inlet being located in the top inner surface near an outer edge of said inner surface and within each portion of the inner surface wiped by the upper surface of each screw element, said inlet being sized or located to avoid complete blockage thereof by the upper ends of the screw elements as they pass beneath the inlet, the upper end of each element having a thin flat raised portion with an abrupt leading edge and spanning the entire width of the element end in a direction transverse to the direction of rotation to define a reservoir which facilitates collecting and spreading fresh polymer on the top plate inner surface. Preferably, the upper ends of the elements have the shape of three intersecting equal arcs and the flat raised portion of each element end extends to the trailing edge of the screw element.

DESCRIPTION OF THE INVENTION

Figure 1:
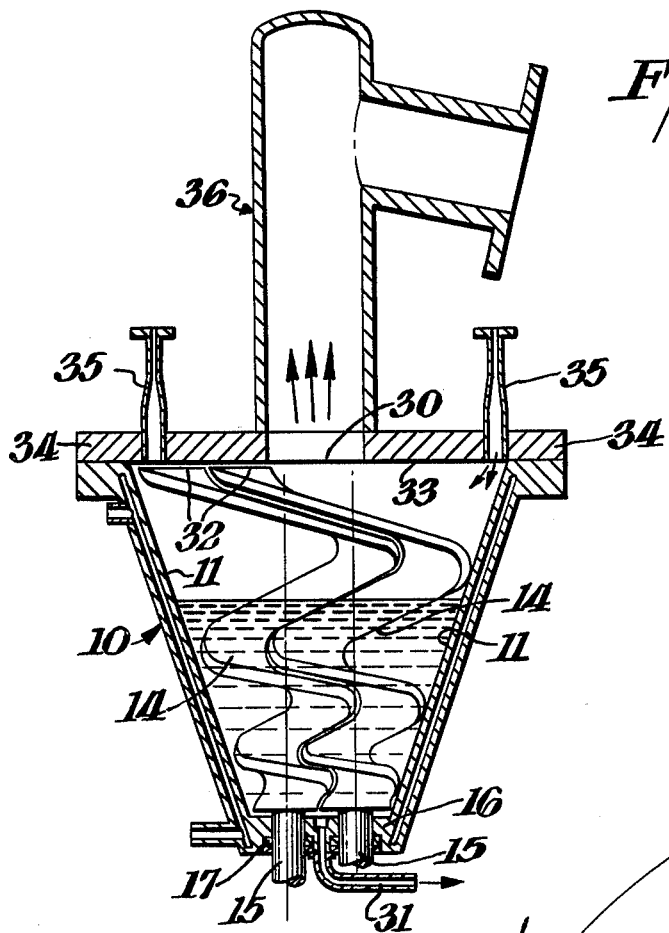
FIG. 1 is a vertical sectional view of an apparatus of this invention.

Referring to FIG. 1, vessel 10 is in the shape of two intersecting conical frustums and has interior wall surface 11. Two co-rotating interengaging helical screw elements 14 are supported on shafts 15 and have an upper end 32. Top plate 34 has inner surface 33 and contains vent 30 and a pair of polymer inlets 35. Discharge 31 is located in the base 16 of the vessel 10, as are seals 17 through which shafts 15 pass. Connected to vent 30 is a heated duct 36 for connecting vessel 10 to an appropriate condenser apparatus such as a water spray or liquid falling film condenser system, not shown.

Figure 2:
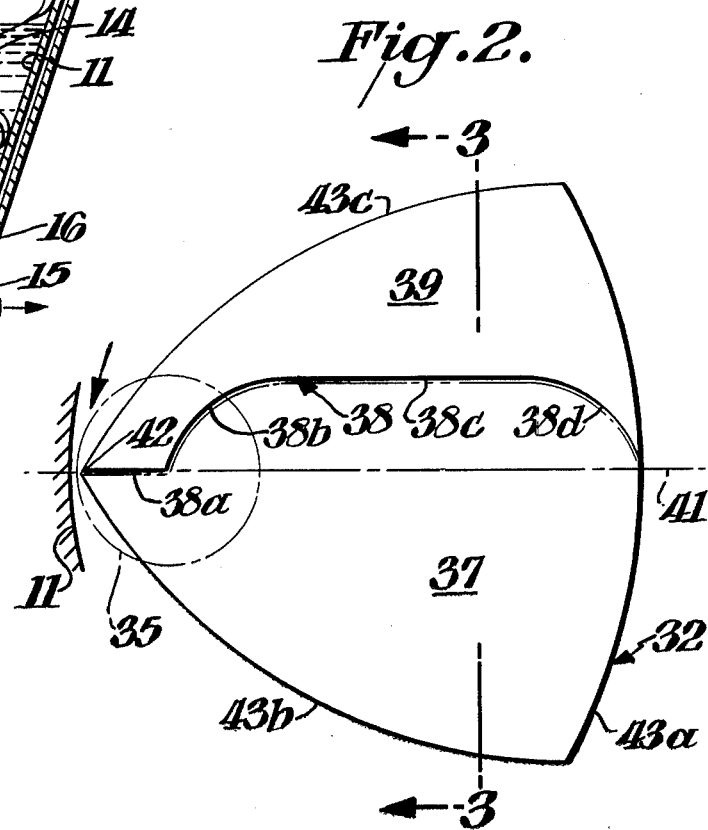
FIG. 2 is a plan view of the upper end surface of a screw element and its orientation with respect to the vessel wall and a polymer inlet.

FIG. 2 shows screw element end 32 having on its flat end surface 37 an abrupt, generally concave, leading edge 38 of thin flat raised portion 39 which spans the entire width of end 32 in a direction transverse to the direction of rotational movement. Leading edge 38 runs from wall-wiping tip 42 straight inwardly along the radius of rotation 41 through tip 42 for a short distance, this portion shown as 38a, and connects through a curved portion 38b to a straight mid-portion of said leading edge, shown as 38c, which is recessed behind said radius line and is within 5° or less of being parallel to said radius line. The inner end of the leading edge 38 then curves in a portion shown as 38d from said straight midportion towards radius line 41 and terminates at the inside edge of screw element end 32. Raised portion 39 extends to the trailing edge of screw element end 32. End 32 is in a generally triangular shape formed by three intersecting equal arcs 43 a, b, and c and is oriented such that tip 42 wipes the vessel interior surface 11. The polymer inlet 35 in top plate 34 is sized and located adjacent the interior surface 11 so that it is not completely blocked by passage of end 32 at any time.

Figure 3:
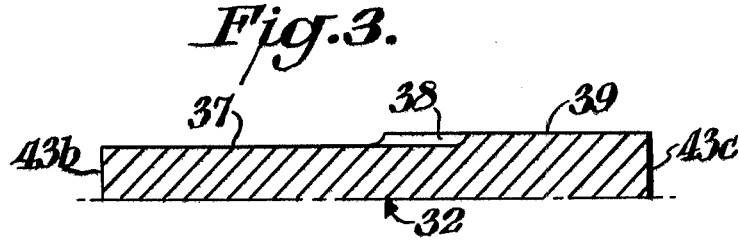
FIG. 3 is a fragmented sectional view, showing the two levels on the end of the screw element taken at 3—3 in FIG. 2.

FIG. 3 is a section of screw element end 32 showing the contour of leading edge 38 and raised portion 39 which is planar and extends to arc 43c which is the trailing edge of end 32. Leading edge 38, which connects flat surface 37 with raised portion 39, is gradually curved to prevent entrapment of polymer.

In operation, the area on the end of the screw element in front of the leading edge of the raised portion serves as a small reservoir for polymer deposited on the ends by the inlets in the top plate of the vessel, permitting the end to spread polymer uniformly across the entire inner surface of the top plate of the vessel throughout an entire revolution of the element. The height of the raised portion and its depth in combination with its clearance from the top plate inner surface control the rate at which polymer escapes to the trailing edge of the element end. Preferably, the height of the raised portion above the flat upper surface is from about 20% to 60% of the clearance between the flat upper surface and the flat inner surface of the top plate 34.

In a typical apparatus for finishing poly(hexamethylene adipamide) the height of the raised portion above the rest of the element end is 0.050 inch (1.3 millimeter) and the straight mid-portion, 38c, of the leading edge is on a radius 2° back from the radius running through the wall wiping tip of the element. The clearance between the top of raised portion 39 from top plate 34, as shown in FIG. 1, is 0.060 inch (1.5 millimeters). Depending upon the size of the vessel, the angle of offset of the leading edge of this straight mid-portion may be preferably 2° to about 4°. The raised portion extends to the trailing edge, 43c, of the element end. Each end of the leading edge curves back toward the radius line running through the wall wiping tip of the element. This helps to keep a supply of polymer on the element end throughout an entire revolution. The wall end of the raised portion is generally in the shape of a hockey stick. Adjacent to the outer wall of the vessel, the leading edge of the raised portion preferably is located on the radius of rotation passing through the tip of the element end to prevent the polymer from traveling away from the wall edge of the element end too quickly thereby starving the delivery of polymer on the inner surface of the top plate near the outer wall. On the other hand, this radial edge should be as short as practically possible so that polymer entering the vessel from the inlet will be carried in greater part towards the center of the element end. A length of 1 to 1.5 inches (2.54 to 3.81 cm.) for this radial edge is suitable for larger element ends but can be shortened for smaller elements to be no more than the radius of the polymer inlet. Element ends modified to have a raised portion with dimensions as described have been found to maintain a uniform coating of fresh material on the inner surface of the top plate of such vessels with liquid viscosities of from 20 to 300 poise with agitator speeds above 16 rpm.

The usefulness of the modified element end is enhanced by proper design and location of the polymer inlets. Preferably, the inlets are located near the intersection of the top plate and the sidewall of the vessel where the entering material is deposited on both sidewall and the top of the element ends. By sizing the inlets to avoid complete blocking as an element rotates underneath the inlet, adverse affects on the velocity of the flow of entering material from the companion nozzles can be avoided. To reduce entrainment of molten particles of polymer in gases being vented from the vessel, the diameter of the inlets should be such that the superficial velocity of vapor in two phase flow is not greater than 55 feet per second (17 meters per second). Vertical orientation of the inlets in the top of the vessel combined with limits on maximum velocity of the entering stream reduce splashing and formation of large aerosol particles that might otherwise be carried into the vent system. Also, locating the inlets near the outer side wall of the vessel provides the longest path between the inlets and the central vent to minimize venting problems.

By this invention, the service life of separator-finisher vessels of the type described can be further enhanced resulting in corresponding economic benefits from their improved operation.

WHAT IS CLAIMED IS:

1. In an apparatus for finishing high viscosity synthetic polymers including an enclosed vessel having an interior surface throughout its length in the shape of two intersecting conical frustums with axes parallel and substantially vertical, the base of the frustums being displaced upward with respect to the apexes, a vent in the upper portion of the vessel and a discharge in the lower portion of the vessel, two interengaging helical screw elements rotatably supported on shafts passing through seals in the base of the vessel, the screw elements when co-rotated conforming to the interior surface of the vessel such that the screw elements effect a complete wiping of the interior surface, and wherein the screw elements interengage uninterruptedly along their lengths such that each element effects a complete wiping of the adjacent element, the bottom portion of the screw elements forming a pressure generating zone and the top portion of the screw elements forming a mixing zone having a hollow center described by the co-rotating screw elements, the vessel having a top plate with a flat inner surface, each screw element having an upper end with a substantially flat upper surface, these flat upper surfaces upon co-rotation effecting complete wiping of the inner surface of the top plate, and at least one polymer inlet in the top plate for feeding molten polymer downwardly into the vessel, the improvement comprising:

said polymer inlet being located in the top inner surface near an outer edge of said inner surface and within each portion of the inner surface wiped by the upper surface of each screw element, said inlet being sized or located to avoid complete blockage thereof by the upper ends of the screw elements as they pass beneath the inlet, the upper end of each element having a thin flat raised portion with an abrupt leading edge and spanning the entire width of the element end in a direction transverse to the direction of rotation to define a reservoir which facilitates collecting and spreading fresh polymer on the top plate inner surface.

2. The apparatus of claim 1 wherein the upper ends of the elements have the shape of three intersecting equal arcs and the raised portion of said flat upper surface of each element end extends to the trailing edge of the screw element.

3. The apparatus of claim 1 wherein the outer end of the leading edge of said raised portion is located along the rotational radius line passing through a wall-wiping tip of the element end beginning at said tip for a short distance inward and said edge then connects through a curved portion with a straight mid-portion of said edge which mid-portion is positioned behind said radius line, said straight mid-portion being angled in a trailing direction no more than 5° withrespect to said radius line, from the inner end of said straight mid-portion said leading edge curves toward said radius line before terminating at the inner edge of said element end.

4. The apparatus of claim 3 wherein said straight mid-portion is angled from about 2° to about 4° with respect to said radius line.

5. The apparatus of claim 3 wherein said leading edge is generally concave along its length.

6. The apparatus of claim 1 wherein the height of said raised portion above said flat upper surface is from about 20% to about 60% of the clearance between said flat upper surface on the element end and the flat inner surface of said top plate.

7. The apparatus of claim 1 wherein the raised portion is planar and extends from the said leading edge to the trailing edge of the element end.

* * * * *